Jan. 17, 1950     R. P. BLAKE     2,494,686
INFRARED LIGHT-POLARIZING MATERIAL
AND METHOD OF MANUFACTURE
Filed Feb. 28, 1945
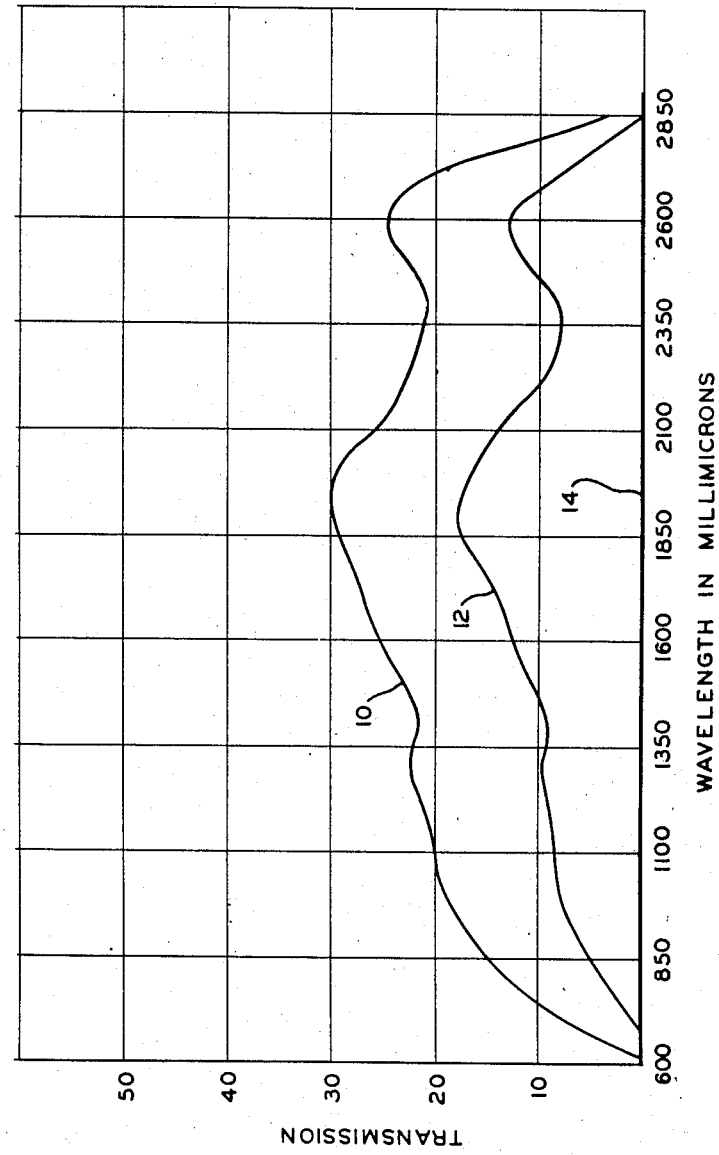
INVENTOR.
Robert P. Blake
BY
Donald C. Brown
Attorney Patented Jan. 17, 1950

2,494,686

UNITED STATES PATENT OFFICE 2,494,686

INFRARED LIGHT-POLARIZING MATERIAL AND METHOD OF MANUFACTURE

Robert P. Blake, Winchester, Mass., assignor to Polaroid Corporation, Cambridge, Mass., a corporation of Delaware Application February 28, 1945, Serial No. 580,227

9 Claims. (Cl. 88—65)

This invention relates to light-polarizing materials and methods of producing the same.

It is a primary object of the invention to provide a polarizing material capable of polarizing infrared radiation, and specifically radiation of wavelengths ranging from approximately 700 m$\mu$ to as high as 3000 m$\mu$.

Another object is to provide such polarizing material in the form of a sheet of molecularly oriented plastic material containing iodine, and particularly wherein said plastic comprises polyvinyl alcohol and has been subjected to a heat treatment imparting thereto the desired properties.

A further object is to provide polarizing material having the above properties and which will be stable to conditions of relatively intense heat.

Still further objects are to provide a method of producing polarizing material having the above characteristics, to provide such a method wherein a plastic material is substantially saturated with iodine, and to provide a process wherein said iodine-saturated sheet is subjected to baking at temperatures of the order of 450° F.

Additional objects and advantages will in part appear and in part be pointed out in the course of the following description of one or more embodiments of the invention, which are given as nonlimiting examples, in connection with the accompanying drawing, which is a graph illustrating optical properties of polarizing material made in accordance with the present invention.

The present invention is concerned with the production of polarizing material capable of polarizing that portion of the infrared spectrum comprising generally radiation of wavelengths ranging from 700 m$\mu$ to 3000 m$\mu$. In accordance with the invention, polarizing material possessing such properties may be produced from transparent plastic materials, and particularly polyvinyl oxy compounds such particularly as polyvinyl alcohol and polyvinyl alcohol derivatives such as the acetals and ketals thereof, by treating said materials with iodine and then subjecting them to a heat treatment at relatively high temperatures as will be described.

More specifically, it is to be understood that the term polyvinylene as used herein and in the claims includes all those compounds, containing unsaturated carbon-to-carbon linkages and either of single or conjugated structure, obtained by subjecting a polyhydroxy alkane sheet material such as polyvinyl alcohol, polyvinyl acetal or polyvinyl ketal to a heat treatment at the relatively high temperature described. Likewise, the polyvinylene-halogen-sorption complex or more particularly the polyvinylene-iodine-sorption complex described below in more detail is the material to which the property of differential absorption of the components of an incident beam of infrared light may be more especially ascribed.

As an example of one embodiment of the invention, a sheet of transparent polyvinyl alcohol of the order of 0.005 inch in thickness may be soaked in a solution comprising iodine, potassium iodide and water in proportions of 5:5:25 respectively. For preferred results it appears that the plastic should be substantially saturated with iodine, in which case it will be found to absorb as much as 35% of its own weight of iodine. A period of approximately eight minutes has been found satisfactory for this step with sheeting of the above thickness and with the solution at room temperature. This time may vary to a considerable extent and is in no way critical. In general less time is needed when the solution is heated, and conversely more time is needed when a thicker sheet is used at the same solution temperature. Care should be taken, however, not to heat the solution to such an extent that the iodine therein begins to evaporate.

After the above soaking step the sheet is preferably at least partially dried, as by heating at a temperature of the order of 200° F. for approximately two minutes, and then stretched to orient the molecules thereof. This may be readily done by first heating the sheet to render it sufficiently soft, and since the efficiency of the finished product as a polarizer depends to a considerable extent upon the degree of orientation obtained, it is desirable that the sheet be stretched as much as is reasonably possible, for example, to from five to seven or more times its original length. Either during or after the stretching operation, the sheet should be subjected to relatively intense heat for a period which may vary considerably, depending upon the thickness of the sheet and its condition of dryness. For example, the above-described sheet may be heated to a temperature of the order of 425 to 450° F. for a period of approximately thirty seconds, and for a thicker or less dry sheet this time may be increased to two minutes or more. It is generally convenient to combine these two steps and to stretch the sheet during the heat treatment, but this is not essential.

The accompanying drawing illustrates the optical properties of a sheet of polarizing material prepared in accordance with the above example. Curve 10 illustrates the transmission of said sheet for incident unpolarized light. It will be noted that said curve shows substantially zero transmission at 600 mμ but then rises fairly rapidly to approximately 16% at 900 mμ and then averages well above 20% until it drops sharply as it approaches 3000 mμ. This drop, however, is due to strong absorption in that region of the spectrum by the polyvinyl alcohol itself. Curve 12 illustrates the transmission of two sheets of said polarizing material with their polarizing axes parallel, and it is substantially parallel to curve 10 beyond 900 mμ and shows an average transmission of approximately 10%. It will be readily understood that a measure of the efficiency of a polarizing material is the difference between the transmission of two pieces of said material with their polarizing axes parallel and the transmission of the same two pieces with their axes crossed. It has been found that the transmission through two of the above sheets with their axes crossed so nearly approaches zero that it cannot be adequately shown on the same scale as curves 10 and 12, as is indicated by showing curve 14 as comprising substantially zero values over the entire illustrated range. In fact, the total transmission of two such crossed sheets for the range 760-3500 mμ has been measured as less than 0.1%, and it follows, therefore, that the radiation transmitted by one of said sheets is substantially perfectly polarized.

The explanation for the above phenomena is somewhat uncertain, but a number of facts have been established. In the first place, although some iodine is driven off from the sheet, it is only a small proportion, for example 5%, of the total orignally absorbed therein. In the second place, the heat treatment apparently causes some dehydration of the sheet and the formation of polarizing molecules of polyvinylene in the same manner as in the process described in Land et al. Patent No. 2,173,304, but this is not responsible for the polarizing properties at wavelengths higher than approximately 1000 mμ although it undoubtedly contributes both to the polarization and to the low transmission at shorter wavelengths. This is established by the fact that if the above sheet has the iodine therein bleached or otherwise removed, its curves will change to the shapes characteristic of the presence of polyvinylene, which possesses substantially no polarizing properties for light of wavelengths longer than approximately 750 mμ.

Certain conclusions may be based upon the above facts. It appears that the heat treatment must result in some rearrangement of the molecular structure of the iodine and sheet, probably either a lengthening of the iodine polymer chains, a stronger interaction between said polymer chains and the hydroxyl groups of the polyvinyl alcohol sheet, or both. The net result appears to be the production of a new polymeric form of iodine or dichroic sorption complex of iodine which possesses dichroism in a portion of the infrared spectrum substantially unaffected by any previously known form of iodine. Furthermore, this explanation is in harmony with the previously observed behavior of iodine. For example, the polarizer disclosed in Land Patent No. 2,237,567 as comprising an iodine stain in molecularly oriented polyvinyl alcohol has a blue-gray appearance in both reflected and transmitted light, deriving its color from what may be termed the blue form of the iodine polymer and its dichroism from the orientation of this form of iodine sorption complex. If such a sheet is subjected to heat, its predominant color will change to a light yellow, with a corresponding shift in the absorption band of the sheet but with comparable dichronism over the new absorption band. A subsequent treatment with water will reverse this reaction, except as to the proportion of the iodine driven off by the heat treatment, and the same pair of reactions can also be carried out in solution. A similar dichroic red or red-brown iodine complex can be produced by the action of a strong solution of iodide ion on the blue iodine complex in a polyvinyl alcohol sheet, and may be returned to the blue form by further treatment with water.

Since as pointed out, the presence of water favors the formation of the blue iodine complex, it appears that the infrared absorbing complex is formed only after all the water absorbed in that polyvinyl alcohol sheet has been driven off. However, this is also the condition favoring the formation of polyvinylene provided there is present a suitable catalyst for the removal of the chemically combined water, and iodine is such a catalyst. It follows, therefore, that whenever the plastic sheet used in the practice of the present invention comprises a vinyl compound capable of conversion to polyvinylene, it may be expected that some polyvinylene will be formed simultaneously with the desired iodine complex. Conversely, the formation of polyvinylene in the process of the invention serves as an indicator of the formation of said new iodine complex.

It should be expressly understood that the present invention is not limited to the above-described embodiment thereof nor to any particular theory of its operation. Many variations may be made without departing from the scope and principles of the invention. For example, in describing the above embodiment it is specified that the plastic sheet should be substantially saturated with iodine. This is desirable in that it insures a final product giving maximum extinction in the crossed position, and it is this extinction value which is usually considered the most important factor in measuring the efficiency of a polarizer. If a higher transmission is desired in the product, it may be obtained by incorporating less iodine in the sheet, but this will also have the effect of increasing transmission in the crossed position. However, since a certain amount of the iodine is evaporated from the sheet during the heat treatment, it should be noted that at least sufficient iodine should be put into the sheet initially to insure having a substantial amount remain therein after the heat treatment. Many variations may be made in the times and temperatures of the heat treatment, which are more or less interdependent, but in general it appears that the desired change in the iodine structure takes place within a practical time only at temperatures above 400° F. and preferably of the order of 425-450° F. or higher. Caution should be exercised to prevent heating to a point such that the sheet becomes totally opaque or begins to char.

Many other variations may be made in the steps of the above process and in the order thereof. For example, it is not essential to incorporate the iodine in the sheet before stretching, but this is preferred for reasons of convenience in that the sheet is then more highly absorptive and takes up the iodine solution more rapidly. Similarly, the heat treatment may take place after the stretching operation as well as simultaneously therewith. All such variations are to be construed as coming within the scope of the invention. It should also be understood that the invention is not limited to polyvinyl alcohol, although said material is preferred by reason of its high absorption of iodine and the high degree to which it may be molecularly oriented. Comparable results may be obtained with other plastics possessing analogous properties, and examples of such materials include polyhydroxy alkane and other linear polyvinyl oxy compounds such particularly as incomplete acetals and ketals of polyvinyl alcohol.

Since certain changes in carrying out the above process, and certain modifications in the products which embody the invention may be made without departing from its scope, it is intended that all matter contained in the above description, or shown in the accompanying drawing shall be interpreted as illustrative and not in a limiting sense.

What is claimed is:

1. In a process of making light-polarizing material, the steps comprising treating a sheet of transparent plastic material comprising polyvinyl alcohol with a solution comprising iodine until a substantial amount of iodine approximating 35% by weight of the polyvinyl alcohol is incorporated with said sheet, stretching said sheet to orient the molecules thereof, and heating said sheet at a temperature higher than 400° F. but below the charring temperature of polyvinyl alcohol until said sheet shows strong dichroic absorption of infrared radiation.

2. In the process of making an infrared light-polarizing material in the range of 600 to 2850 m$\mu$, the steps comprising treating a sheet of a transparent linear polyhydroxy alkane selected from the group consisting of polyvinyl alcohol, polyvinyl acetal and polyvinyl ketal with a solution comprising a halogen until a substantial amount of the halogen approximating 35% by weight of the polyhydroxy alkane is incorporated within said sheet, stretching said sheet to orient the molecules thereof, and heating said sheet at a temperature of 400–450° F. but below the charring temperature of the polyhydroxy alkane for a period of approximately 30 seconds whereby said sheet shows strong dichroic absorption of infrared radiation.

3. In the process of making an infrared light-polarizing material in the range of 600 to 2850 m$\mu$, the steps comprising treating a sheet of a transparent linear polyhydroxy alkane selected from the group consisting of polyvinyl alcohol, polyvinyl acetal and polyvinyl ketal with a solution comprising an iodine until a substantial amount of the iodine approximating 35% by weight of the polyhydroxy alkane is incorporated within said sheet, stretching said sheet to orient the molecules thereof, and heating said sheet at a temperature of 400–450° F. but below the charring temperature of the polyhydroxy alkane for a period of approximately 30 seconds whereby said sheet shows strong dichroic absorption of infrared radiation.

4. A light-polarizing sheet for the infrared comprising a molecularly oriented linear polyvinyl alcohol, said sheet having an oriented dichroic polyvinyl alcohol-polyvinylene-halogen-sorption complex incorporated therein, said sorption complex being substantially opaque to visible radiation in the wavelength band below 600 m$\mu$ and being a substantially complete polarizer for radiation within the wavelength band of from 600 m$\mu$ to 2850 m$\mu$, said sorption complex being the product of the steps of incorporating in said molecularly oriented linear polyvinyl alcohol a quantity of said halogen of the order of 35% by weight of said polyvinyl alcohol and thereafter heating said polyvinyl alcohol complex to a temperature of the order of 400° F. for a short period.

5. A light-polarizing sheet for the infrared comprising a molecularly oriented linear polyvinyl alcohol, said sheet having an oriented dichroic polyvinyl alcohol - polyvinylene - iodine-sorption complex incorporated therein, said sorption complex being substantially opaque to visible radiation in the wavelength band below 600 m$\mu$ and being a substantially complete polarizer for radiation within the wavelength band of from 600 m$\mu$ to 2850 m$\mu$, said sorption complex being the product of the steps of incorporating in said molecularly oriented linear polyvinyl alcohol a quantity of said iodine of the order of 35% by weight of said polyvinyl alcohol and thereafter heating said polyvinyl alcohol complex to a temperature of the order of 400° F. for a short period.

6. In a process of preparing a light-polarizing sheet for the infrared in the range of 600 to 2850 m$\mu$, said sheet comprising a molecularly oriented linear polyhydroxy alkane selected from the group consisting of polyvinyl alcohol, polyvinyl acetal and polyvinyl ketal, the sheet containing a substantial amount of a halogen approximating 35% by weight of the polyhydroxy alkane, the step of subjecting the sheet to a temperature of 400–450° F. for a period of approximately 30 seconds, whereby an oriented dichroic polyhydroxy alkane - polyvinylene - halogen - sorption complex is formed and substantially all absorbed water and some of the chemically combined water is removed.

7. A light-polarizing sheet for the infrared comprising a molecularly oriented linear polyhydroxy alkane selected from the group consisting of polyvinyl alcohol, polyvinyl acetal and polyvinyl ketal, said sheet having incorporated therein an oriented dichroic halogen complex and a polyvinylene complex, the halogen and polyvinylene complexes cooperating to form a sorption complex which is substantially opaque to visible radiation in the wavelength band below 600 m$\mu$ and being a substantially complete polarizer for radiation within the wavelength band from 600 to 2850 m$\mu$.

8. A light-polarizing sheet for the infrared comprising a molecularly oriented linear polyhydroxy alkane selected from the group consisting of polyvinyl alcohol, polyvinyl acetal and polyvinyl ketal, said sheet having an oriented dichroic polyhydroxy alkane-polyvinylene-iodine-sorption complex incorporated therein, said sheet containing by weight approximately 30% of iodine, said sheet being substantially opaque to visible radiation in the wavelength band below 600 m$\mu$ and being a substantially complete polarizer for radiation in the wavelength band of from 600 to 2850 m$\mu$, said sorption complex being the product of the incorporation in a molecularly oriented sheet of said polyhydroxy alkane of a quantity of iodine in excess of 30% by weight of said polyhydroxy alkane and thereafter heating said sheet at a temperature below the charring temperature for said polyhydroxy alkane to form polyvinylene therein and to drive off a small percentage of the iodine incorporated in said sheet.

9. A light-polarizing sheet for the infrared comprising a molecularly oriented linear polyvinyl alcohol, said sheet having an oriented dichroic polyvinyl alcohol - polyvinylene - iodine-sorption complex incorporated therein, said sheet containing by weight approximately 30% of iodine, said sheet being substantially opaque to visible radiation in the wavelength band below 600 mμ and being a substantially complete polarizer for radiation in the wavelength band of from 600 to 2850 mμ, said sorption complex being the product of the incorporation in a molecularly oriented sheet of said polyvinyl alcohol of a quantity of iodine in excess of 30% by weight of said polyvinyl alcohol and thereafter heating said sheet at a temperature below the charring temperature for said polyvinyl alcohol to form polyvinylene therein and to drive off a small percentage of the iodine incorporated in said sheet.

ROBERT P. BLAKE.

REFERENCES CITED

The following references are of record in the file of this patent:

UNITED STATES PATENTS

| Number | Name | Date |
| --- | --- | --- |
| 2,167,899 | Marks | Aug. 1, 1939 |
| 2,173,304 | Land et al. | Sept. 19, 1939 |
| 2,237,567 | Land | Apr. 8, 1941 |